United States Patent
Ferber et al.

(10) Patent No.: US 7,382,685 B2
(45) Date of Patent: Jun. 3, 2008

(54) METHOD AND APPARATUS FOR FILTERING IRREGULARLY SAMPLED DATA

(75) Inventors: Ralf Ferber, Horsham (GB); Ali Ozbek, Milton (GB)

(73) Assignee: WesternGeco L.L.C., Houston, TX (US)

( * ) Notice: Subject to any disclaimer, the term of this patent is extended or adjusted under 35 U.S.C. 154(b) by 322 days.

(21) Appl. No.: 11/066,580

(22) Filed: Feb. 25, 2005

(65) Prior Publication Data
US 2005/0190650 A1 Sep. 1, 2005

(30) Foreign Application Priority Data
Feb. 27, 2004 (GB) .................. 0404355.0

(51) Int. Cl.
*G01V 1/28* (2006.01)
(52) U.S. Cl. .................. 367/43; 367/38; 702/17
(58) Field of Classification Search .................. 367/38, 367/43; 702/17
See application file for complete search history.

(56) References Cited

U.S. PATENT DOCUMENTS

| | | | |
|---|---|---|---|
| 4,837,723 A | 6/1989 | Peacock | |
| 5,067,112 A | 11/1991 | Meek et al. | |
| 5,206,837 A * | 4/1993 | Beasley et al. | ............. 367/38 |
| 6,418,379 B1 * | 7/2002 | Bloor et al. | ................. 702/17 |

FOREIGN PATENT DOCUMENTS

| | | |
|---|---|---|
| GB | 2409899 A | 7/2005 |
| WO | WO 1997/025632 A1 | 7/1997 |
| WO | WO 1999/060423 A1 | 11/1999 |
| WO | WO 2000/042448 A1 | 7/2000 |

OTHER PUBLICATIONS

Duijndam et al Irregular and sparse sampling in exploration seismology Nonuniform sampling: theory and practice (ed. Marvasti), Kluwer Academic/Plenum Publishers, New York, 2001, pp. 479-518.
Newman et al Patterns—with a pinch of salt Geophysical Prospecting, vol. 21, 1973, pp. 197-219.
Ristau et al Adaptive filtering of random noise in 2-D geophysical data Geophysics, vol. 66, No. 1, 2001, pp. 342-349.
Sloan A fast algorithm for constructing Delaunay triangulations in the plane Adv. Eng. Software, vol. 9, No. 1, 1987, pp. 34-55.

* cited by examiner

*Primary Examiner*—Ian J Lobo
(74) *Attorney, Agent, or Firm*—Ari Pramudji; Liangang (Mark) Ye; Jeffrey E. Griffin

(57) ABSTRACT

A method and apparatus for filtering data acquired at a plurality of discrete data points is described, using the steps of defining a filter having defined filter values at defined filter points at least partially not coincident with the data points and using the defined filter values at the defined filter points to determine filter values at the data points, thereby correcting the filter to have filter values at filter points coinciding with the data points and filtering the data using the corrected filter.

17 Claims, 11 Drawing Sheets

METHOD AND APPARATUS FOR FILTERING IRREGULARLY SAMPLED DATA

The present invention generally relates to apparatus and methods for filtering irregularly sampled data, more specifically seismic data and even more specifically seismic data acquired from point receivers. It particularly relates to a process for multi-dimensional filtering of irregularly sampled seismic data. The invention may be applied to filtering seismic data to attenuate coherent noise and interference in the data so as to provide better-quality images of the earth's interior. The invention may also be applied to the process of digital group-forming of seismic data recorded using point receivers.

BACKGROUND OF THE INVENTION

In seismic surveys, a seismic source is actuated to induce seismic waves at or near the surface of the earth. Explosive sources, vibrating devices and airguns are examples of seismic sources. The seismic waves propagate into and through the earth and are reflected, refracted, and diffracted by geological formations within the earth. Some seismic waves are directed back to the earth's surface, and can be detected by a plurality of seismic receivers (or seismic sensors), such as geophones or hydrophones, deployed at the earth's surface. Each such receiver monitors and records the seismic wavefield at the receiver's location. Typically a receiver monitors the seismic wavefield for a given period after actuation of a seismic source. The data received and recorded by a receiver are in the form of a record of the variation over time of one or more components of the seismic wavefield, and are collectively called a trace. The collection of traces is stored for further processing in known ways to obtain information about the earth's subsurface. Such information is commonly interpreted by geophysicists to detect the possible presence of hydrocarbons, or to monitor changes in hydrocarbon bearing rocks in the subsurface.

Seismic data in general contains noise signals, which may be coherent or incoherent, as well as the desired seismic reflection signals. These noise signals, hereafter referred as just "noise", interfere with the interpretation of the seismic signals, and degrade the quality of the subsurface images that can be obtained by processing the recorded seismic data. It is therefore very desirable to suppress or attenuate the noise that is present in the recorded seismic data before processing the data to obtain an image of the earth's interior.

In land-based seismic surveys, source-generated coherent noise such as ground-roll waves and air-waves are the dominant noise types, and can lead to severe degradation in the quality of the processed data. In marine seismic surveys, energy propagating as waves trapped in the water-column or in the near-surface layers of the seabed is a significant source of coherent noise. Further significant sources of coherent noise are swell noise and bulge-wave noise, which result from waves propagating down the streamers on which the receivers are mounted. Other sources of coherent noise in marine seismic surveys include passing vessels, other vessels acquiring seismic data in the vicinity, and nearby drilling rig activity.

One conventional method of noise attenuation in seismic acquisition is through the process of analogue group-forming. The receivers are hard-wired into groups, or "arrays" of receivers. The analogue output of an array is the normalised sum (arithmetic average) of all traces, acquired by the receivers in the array. The array support is usually rectangular. Consequently, the spectral response of the array is approximately a frequency-independent 2-D sinc function in the wavenumber (kx-ky) space. However, since ground-roll waves have finite apparent velocity, a frequency independent filter is not ideal for separating signal and noise in acquired seismic data. High frequency components of some seismic events (for example seismic events arising from dipped, non-horizontal reflectors) may be erroneously attenuated, while the low frequency components of the ground-roll noise may not be attenuated.

Recently, point receiver recording (also known as single sensor acquisition) of seismic data has become possible. In point receiver recording the receivers are not hard-wired into groups, so that the individual data traces recorded by each receiver are recorded and are available for processing. While it is still desirable to sum traces acquired by more than one receiver, the summation is performed at the processing stage by digital group-forming on individual traces from many receivers. Point receiver recording allows the use of digital group-forming for better noise attenuation and signal preservation. It is also possible to vary the size and composition of the groups formed in the digital group-forming process.

Digital group-forming consists of the application of a 3-D filter with two spatial axes and one temporal frequency axis, which allows much better control of the signal protection and noise rejection zones in the spectral (frequency-wavenumber—f-kx-ky) domain. The 3-D filter may be either deterministic as described for example in the co-owned British patent application no. 0400409.9, or adaptive as described for example in the co-owned published international patent applications Wo 99/60423 and WO 97/25632 or, in fact, any other known method to define a suitable filter.

The natural data structures of the data input into the group-forming process are individual common source gathers. A common source gather is, as the name suggests, the ensemble of all point receiver recordings acquired following actuation of an individual seismic source. In the digital group-forming process a digital group-forming (DGF) filter is convolved with the point receiver data traces, and the output is a set of digital group-formed traces. Usually, the number of output traces will be far less than the number of original point receiver traces.

The design of multi-dimensional filters used for digital group-forming conventionally requires regular sampling of the seismic data. Regular sampling in the context of this invention means for example spatial sampling of seismic data at locations arranged on a regular grid such as a rectangular or a hexagonal grid, although other regular grid patterns can be used as well. The sampling along the time axis is also required to be regular.

One problem encountered in processing seismic data is that, in a real seismic survey, the seismic wavefield is often sampled at locations that are spatially irregular and do not lie on a regular grid. Seismic data is therefore available only for points that are irregularly distributed. Points for which seismic data are available are hereinafter known as "data points".

The fact that data points are not regularly distributed is usually ignored in the design and application of multi-dimensional filters for group-forming. Consequently, the actual response of the DGF filter can be different from the theoretical response of the filter. The signal pass zone of the filter in the spectral domain can be distorted, so that the pass zone may be smaller than designed, the gain may end up being significantly different from unity, and the phase may end up being significantly different from zero. The sidelobes of the filter (i.e. the gain in the reject zone) may be significantly increased. This can lead to distortion of the seismic signal and to noise leakage.

Newman and Mahoney have studied, in "Geophysical Prospecting", Vol. 21, pp.197-219 (1973), the effects of errors in sensor positions in 1-D linear arrays, and have shown that the side-lobes in the array reject regions when sensor positions are not regular are much higher than the theoretical values corresponding to the perfect arrays. The inventors have made similar calculations for 2-D and 3-D arrays, using both conventional analogue groups as well as those designed using APOCS, and these calculations have confirmed the previous 1-D results.

A. J. W. Duijndam et al. have suggested, in "Irregular and Sparse Sampling in Exploration Seismology", in Nonuniform Sampling: Theory and Practice, ed. F. Marvasti, Kluwer Academic, pp. 479-517, New York (2001), that one way to overcome the problem of multi-dimensional filtering of irregularly sampled seismic data would be to regularise the irregularly sampled seismic data, by interpolating the data to a common regular sampling pattern, and then to apply filters designed for that regular pattern. While this approach would in principle be effective, this approach would generally not be practicable in the case of a real seismic survey. Applying this method to the data acquired in a practical seismic survey would require vast computing time and would be too expensive, given the enormous size of 3-D seismic data sets.

Another limitation of this prior art approach is that the regularisation approaches have to assume that the data is bandlimited in the wavenumber domain. In practice, the spatial bandwidth of some types of coherent noise, in particular ground-roll noise, may change depending on the receiver location, and be difficult to estimate beforehand.

SUMMARY OF THE INVENTION

A first aspect of the invention relates to a method of filtering data acquired at a plurality of discrete data points, using the steps of defining a filter having defined filter values at defined filter points at least partially not coincident with the data points and using the defined filter values at the defined filter points to determine filter values at the data points, thereby correcting the filter to have filter values at filter points coinciding with the data points and filtering the data using the corrected filter.

Thus, the invention provides a method to correct filters which are defined at one set of (filter) points such that the filter is immediately applicable to data obtained for data points different from the filter points. The original set of filter points is generally a regular grid, whereas the data are obtained at from real measurements and therefore prone to deviation from such a regular grid. However it should be apparent that the method can be applied to any filtering operation in which data points and defined filter points do not coincide. Essentially it moves the support of the filter to the data points and determines the correct filter value at those data points.

Within the scope of present invention points can be any set of coordinates, whether in space or in time, and any transforms of such coordinates in a transform domain.

In a preferred embodiment of the invention an interpolation is used to determine the filter values at the data points from the defined filter values at the defined filter points. The interpolation method is preferably one which preserves the defined filter values at the defined filter points.

In a further variant of the invention the corrected filter values are weighted. The weight compensates for the irregular spacing and the resulting non-uniform density of data points and can, hence, be derived from various geometrical considerations. A preferred geometrically derived weight is based on scaling each filter value at a data point with a measure of the area or space around it. Such a division of a space or areas into sub-parts with a mapping of the sub-parts to a point is referred to as tessellation. Specifically advantageous methods to derive weights include a Delaunay- or Voronoi-based tessellation.

The performance of the filter can be further improved by limiting or clipping the weight so as to avoid extreme differences in the weights derived solely from geometrical aspects as above.

In another preferred embodiment the corrected filter is derived using both interpolation and weighting.

It is a particular advantage of the present method that the resulting, corrected filter can be applied in the same manner to the real data as the defined filter would be to regularly sampled data. The application of the corrected filter to the irregular data is thus reduced to a standard convolution operation, in which filter values or coefficients and data are multiplied and summed. The characteristic or performance of the original defined filter can be further preserved by normalizing both defined and corrected filter to give at least locally the same response, for example along the frequency axis, where $k_x$ and $k_y$ are zero.

A second aspect of the invention relates to an signal filtering apparatus adapted to perform the above-described operations. In particular, such an apparatus may include a filter generator to generate defined filter values at defined filter points, a filter modifier to determine corrected filter values at corrected filter points coinciding with data points, and a convolver to convolve data values obtained at the data points with the corrected filter values.

It is a further aspect of the invention to apply the above methods and apparatus of the invention to seismic data. As described in the introductory part of this description, it is common in seismic surveys that receivers cannot be placed in an ideal manner, e.g. on a regular grid.

It is another aspect of the invention to apply the above methods and apparatus of the invention to seismic data obtained from point receivers. As described in the introductory part of this description, point receivers are single receivers or spatially confined groups of receivers that can be regarded as points with respect to the acoustic wavelength measured. The method and apparatus can be used to perform a group forming operation on the point receiver data, as a result of which operation several point receivers deliver similar or better signal quality than the conventional analogue groups. Hence the filter of the present invention groups a point receiver with neighboring point receivers to reduce the noise and aliases in the seismic signal.

These and other aspects of the invention will be apparent from the following detailed description of non-limitative examples and drawings.

DETAILED DESCRIPTION AND EXAMPLES

Without loss of generality the invention will be described for an embodiment in which the seismic data was acquired with regular temporal sampling—that is, the data is irregularly sampled in spatial co-ordinates, but is regularly sampled in time. However, the invention may also be applied to seismic data that are irregularly sampled in time as well as irregularly sampled in space.

In the following description a distinction is made between "ideal data locations" and "actual data locations". An "ideal data location" is a location at which seismic data ideally should be collected; the ideal data locations lie on a regular grid that may be, for example rectangular or hexagonal. An "actual data location" is a location at which seismic data collection took place; the actual data locations for an actual seismic survey are assumed to be irregularly distributed as will be almost always be the case. "Data collection" means the process of actually recording seismic data at the actual data locations, as well as the process of assigning seismic data spatial locations during further processing of the data. A seismic data spatial locations may be any one of the locations that characterize a seismic trace, such as, for example, the midpoint between the source and the receiver, the source location, the receiver location, etc.

Figure 1:
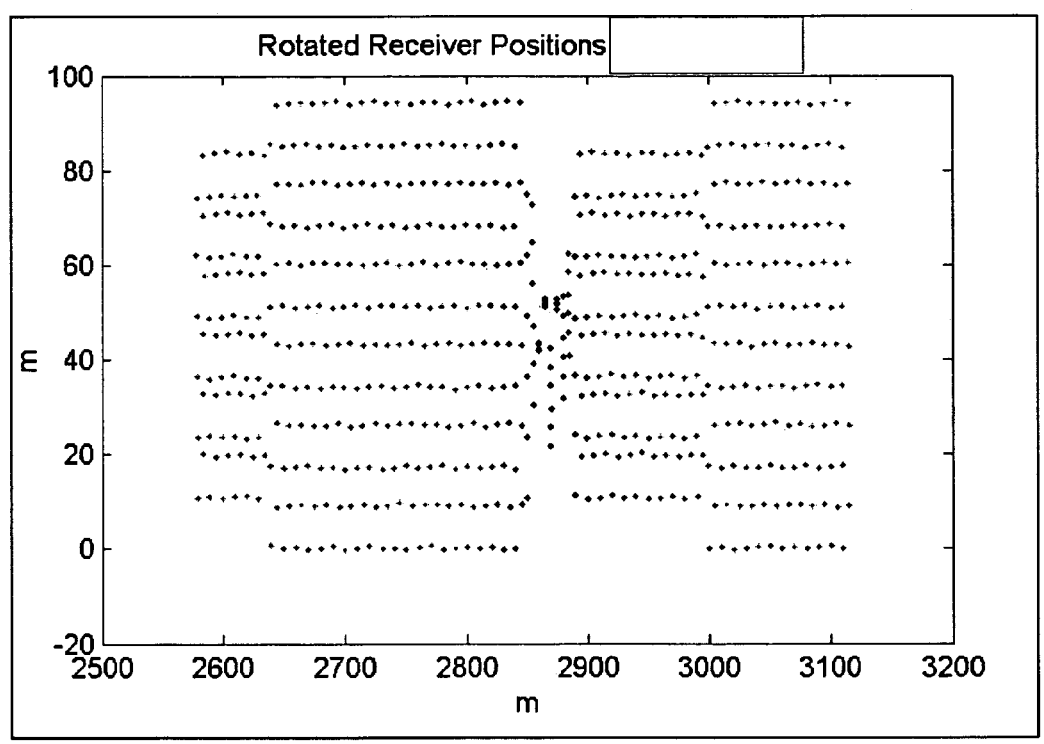
FIG. 1 illustrates a typical spatial distribution of data sample points or seismic receivers in a seismic survey.

FIG. 1 illustrates a typical distribution of seismic receivers in a seismic survey. Each "x" in FIG. 1 represent the location of a geophone, and the x- and y-axes denote distance in meters. The geophones locations deviate in sections from the desired regular grid, so that the acquired seismic data in a survey using this receiver array will not be distributed on a regular grid either.

The invention will be described with reference to an example in which the filter is to be applied to "raw" seismic data as recorded at the location of and by the receiver. However, the invention is not limited to this and may be applied to any other form of processed seismic data or, in fact, any other data, such as image data, where it is difficult to apply filters defined on one set of point because the data is sampled on a different set of points.

Figure 2:
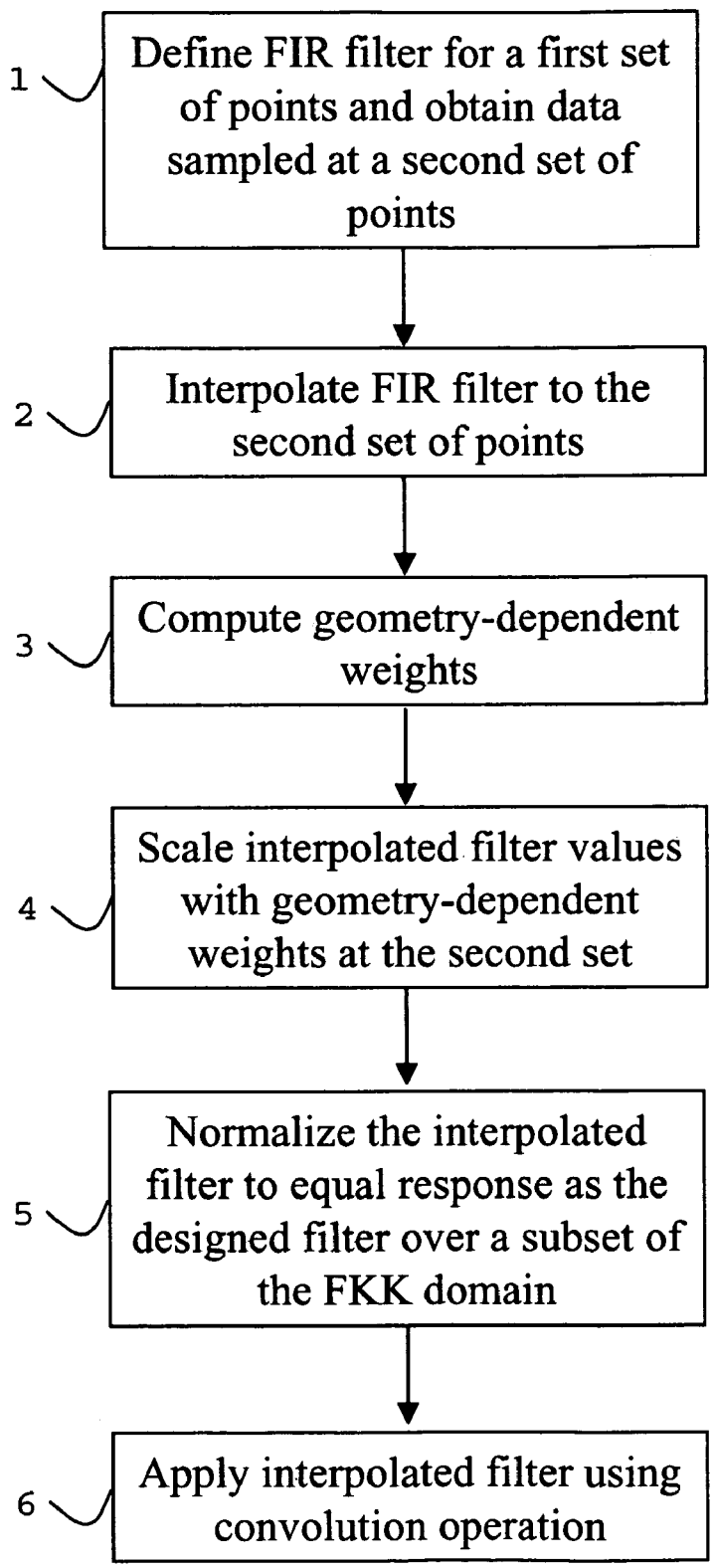
FIG. 2 is a schematic block diagram of a method or apparatus in accordance with an example of the present invention.

FIG. 2 is a schematic diagram showing the principal steps of a method according to an embodiment of the invention or, alternatively, the principal components of an apparatus in accordance with an embodiment of the invention. The sequence of steps as illustrated is a preferred one but may be varied depending on circumstance. Each step will be further illustrated with reference to the following FIGS. 3 to 8. It is assumed that seismic data that is spatially irregularly-sampled has been acquired (or, if the invention is applied to pre-existing seismic data, that spatially irregularly-sampled seismic data has been retrieved from storage). The step of acquiring (or retrieving) the seismic data is included in step 1 of FIG. 2. Each of the actual data locations corresponds to the location of a receiver.

Initially, at step 1, an "ideal" filter operator is designed. The ideal filter operator is designed on the assumption that the seismic data would be acquired at ideal data locations which are spatially arranged on a ideal grid which coincides with the filter grid, for example a regular grid such as a rectangular or hexagonal grid. This grid may be optionally over-sampled with respect to the ideal data locations. Designing the ideal filter operator will consist of, for each ideal data location, defining a set of filter coefficients for that ideal data location. The ideal filter operator will generally be a multi-dimensional finite impulse response (FIR) filter.

Figure 3A:
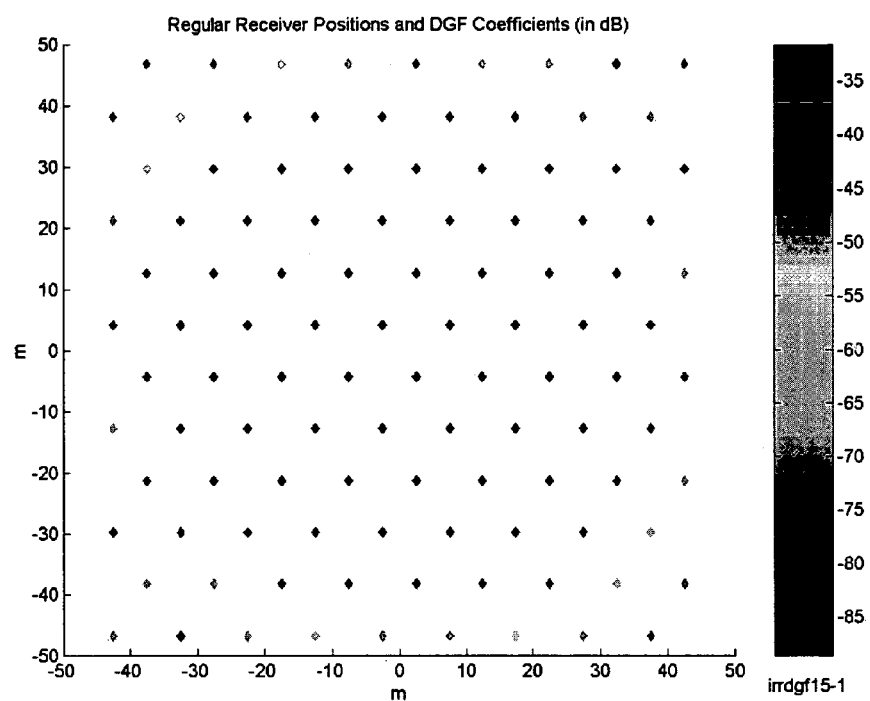
FIG. 3A is an example of a known filter.

Such filters are known as such and in FIG. 3A there is shown a schematic representation of a regular filter. The filter is represented by a regular grid of filter points or locations, the filter support or length, and filter values, such as attenuation or dB values associated with each point. The individual filter values are not of importance for the present specification, and it suffices to note that generally the attenuation is designed to be higher at fringes of the support and decrease towards the middle.

Figure 3B:
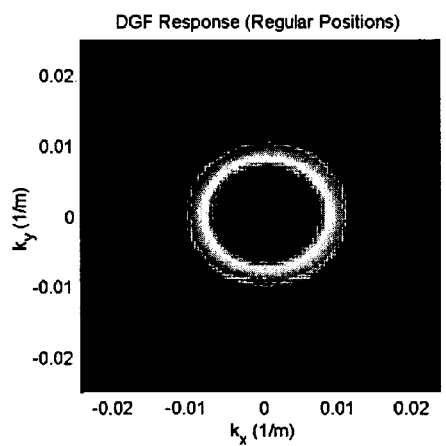
FIG. 3B is a part (main lobe) of the response of the filter of FIG. 3A applied to ideal data.
Figure 8:
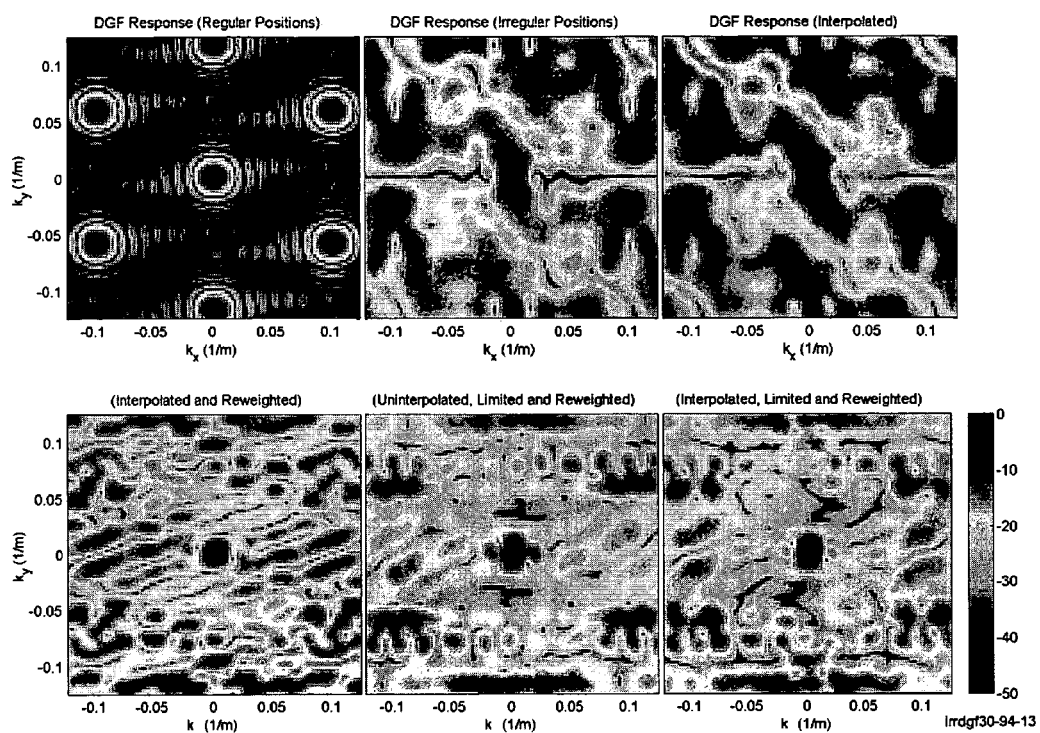
FIG. 8 is a panel of the responses including mainlobe and some aliases of six filters for comparison.

In FIG. 3B, the center or main lobe in the response of such a filter is shown when applied to data sampled at the same regular grid. The contour plot of FIG. 3B shows a well-defined circular pass region with steep transition into the surrounding reject or stop area. In FIG. 8, the top left panel shows the main lobe of FIG. 3B in the center surrounded by its aliased images to serve as a comparative example.

Figure 4A:
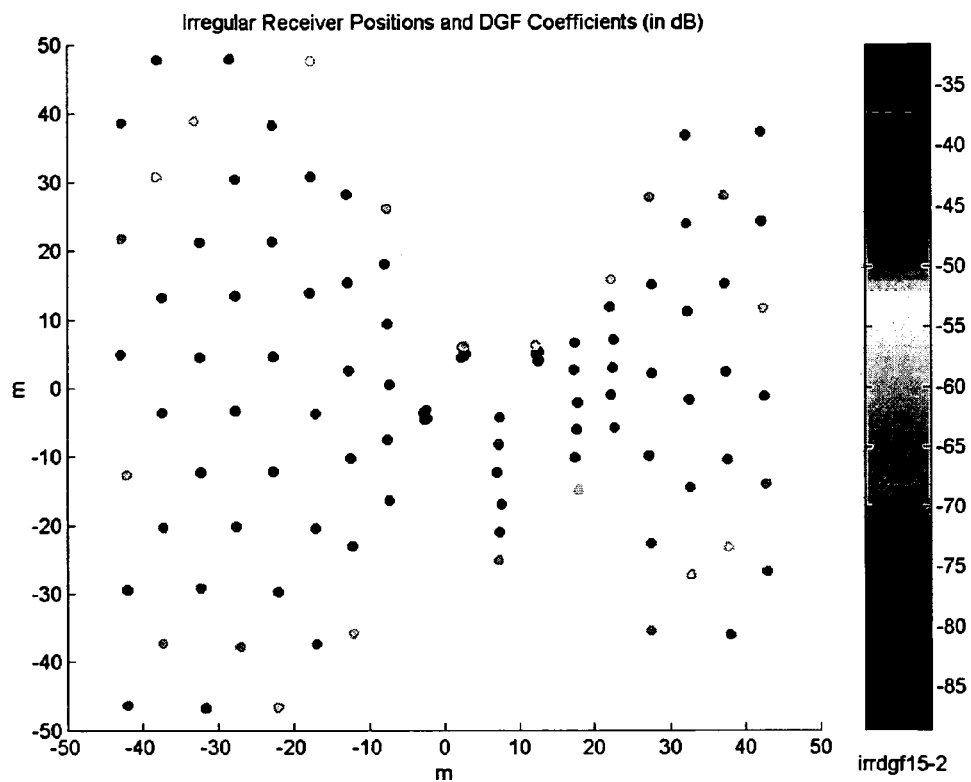
FIG. 4A shows the filter of FIG. 3A applied to the data sampled as shown in FIG. 1.
Figure 4B:
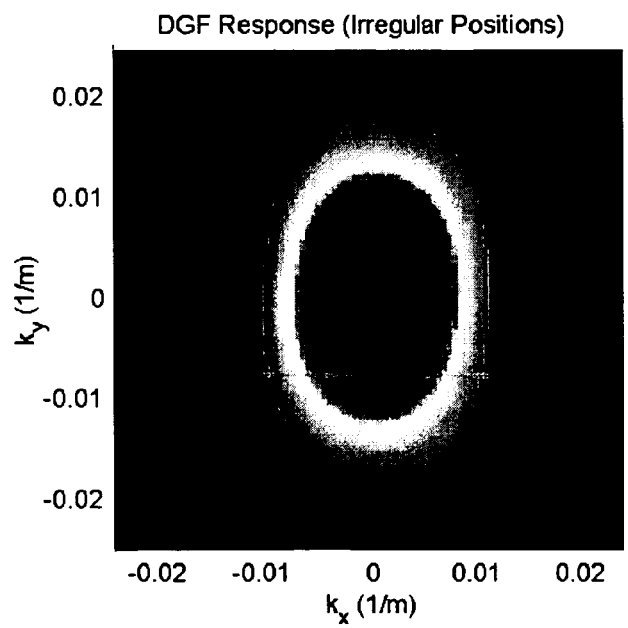
FIG. 4B is a part (main lobe) of the response of the filter of FIG. 3A applied to the data sampled as shown in FIG. 1.

However, as explained above, the actual data locations at which seismic data is acquired will generally not be the same as the ideal data locations. FIG. 4 illustrates the effect of applying the regular filter of FIG. 3 without corrections directly to the irregularly sampled data. Filter values or coefficients are assigned to the data in the sequence such data is recorded. Such a filter is shown in FIG. 4A. Though nominally each data point in FIG. 4 now coincides with a filter point, the filter values are those defined for the ideal filter points. As a result, the main lobe shown in FIG. 4B is distorted. In FIG. 8, the top middle panel shows the main lobe of FIG. 4B in the center surrounded by its aliased images and sidelobes generated through the application of the ideal and hence incorrect filter.

Thus, at step 2, a corrected filter is estimated for each of the actual data locations. This is done by, for each actual data location, estimating a set of filter values or coefficients for that actual data location. The filter coefficients for the actual data locations are estimated from the coefficients of the ideal filter defined for the ideal data locations at step 1, for example by interpolation from the coefficients of the ideal filter.

The filter coefficients for each actual data location may be time dependent and thus require recalculation at each time lag between data points.

The filter values are interpolated using a 2D cubic interpolation. Preferred methods of estimating the filter coefficients for an actual data location include interpolation methods such as sinc (band-limited), spline, polynomial, etc. interpolation methods. The interpolation weights are the same for all the time lags of the filter.

Figure 5A:
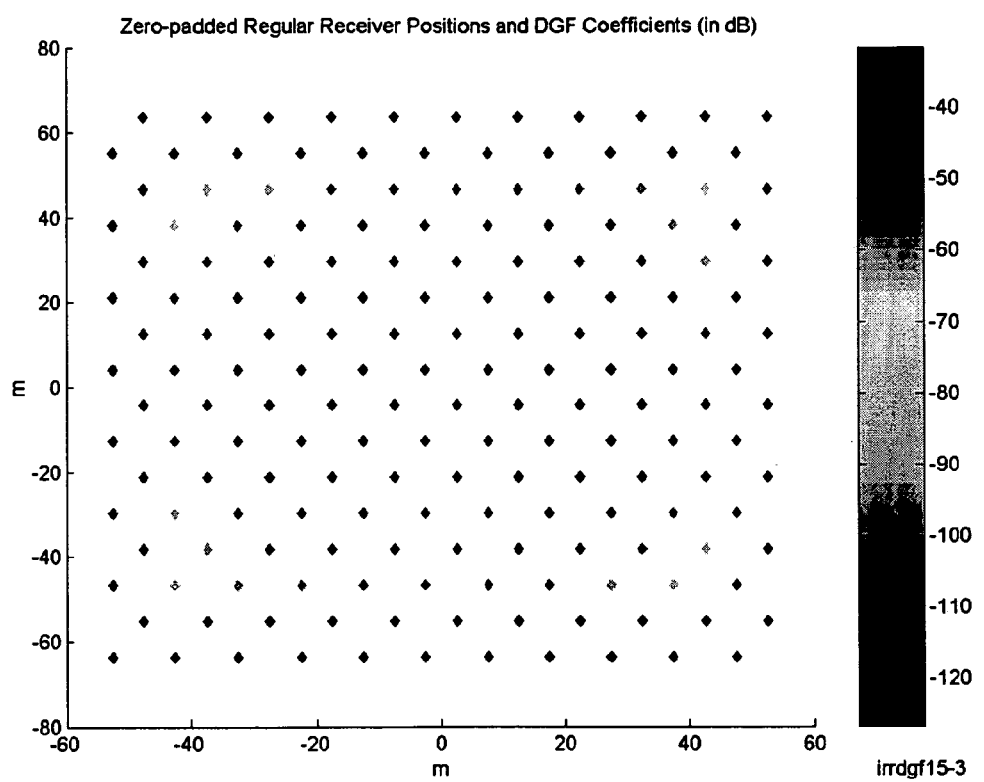
FIG. 5A is a zero-padded version of the filter of FIG. 3A.
Figure 5B:
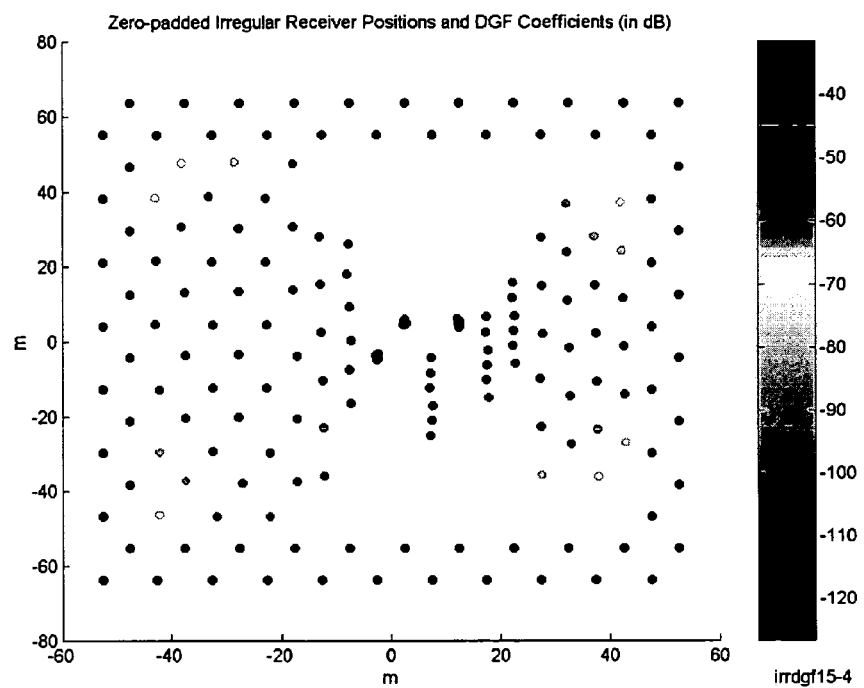
FIG. 5B is of the filter of FIG. 3A with filter values interpolated to the data points as shown in FIG. 1.
Figure 5C:
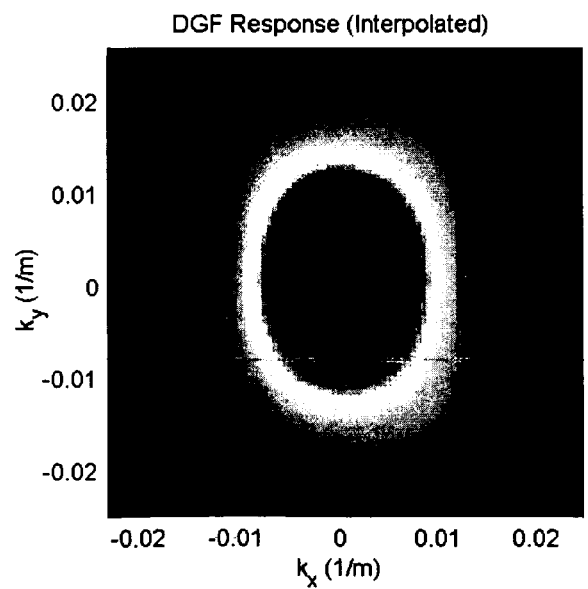
FIG. 5C is a part (main lobe) of the response of the filter of FIG. 5B applied to the data sampled as shown in FIG. 1.

In preparation for the interpolation step, the grid of points for which the original ideal filter is defined is preferably extended and the ideal filter set to zero for points outside the area for which the ideal filter was originally defined. The ideal filter support advantageously includes the data space. This ensures that the interpolation process can be carried out reliably for actual data locations that are near the edge of the area for which the ideal filter is defined. In FIG. 5A there is shown the zero-padded ideal filter. In FIG. 5B there is shown the interpolated filter, which has interpolated filter values or coefficients at points coinciding with the data points. Again, the main lobe of the response of the interpolated is shown in FIG. 5C. Whilst the differences caused by the interpolation are in the present example limited to a slightly more circular main lobe when comparing FIG. 5C to FIG. 4B, interpolation alone may result in many cases already to a significant improvement of the performance of the filter.

In FIG. 8, the top right panel shows the main lobe of FIG. 5C in the center surrounded by its aliased images and sidelobes generated through the application of the interpolated filter to the data.

The filtering can also be improved or corrected using additional weights. These weights take generally the form of factors to be multiplied with the (interpolated) filter values.

Since the actual data locations are distributed irregularly, the weights of the actual data locations will vary from one actual data location to another. At step 3, therefore, a weight is determined for each actual data point. According to a preferred embodiment this is done by tessellating the domain of the actual data locations using, for example, Delaunay triangulation as described by S. W. Sloan in "A fast algorithm for constructing Delaunay triangulations in a plane", Adv. Eng. Software, vol. 8, pp.34-55 (1987).

Figure 6A:
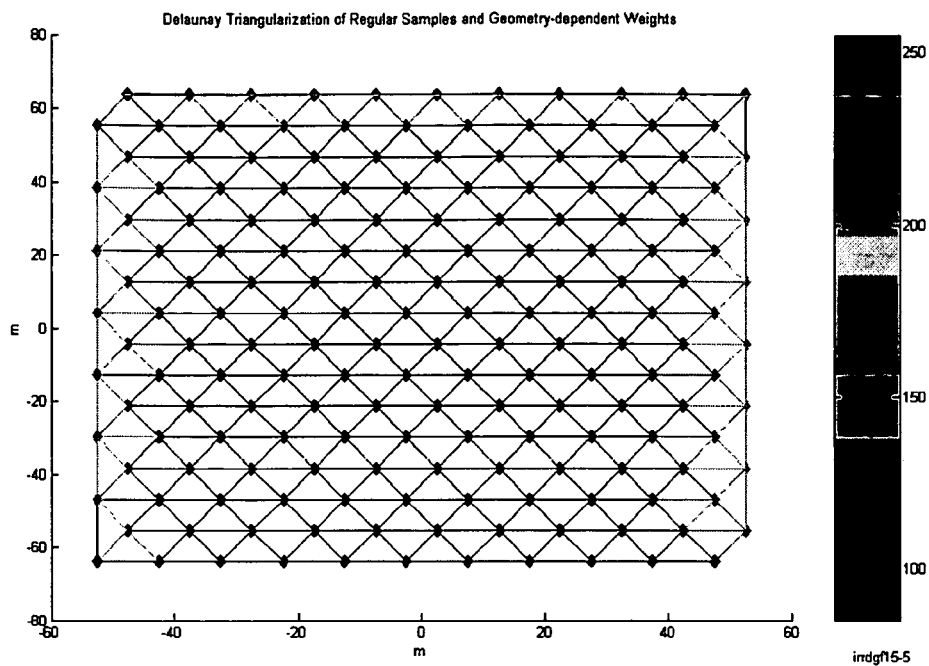
FIG. 6A illustrates a tessellation on a regular grid.

In Delaunay triangulation, the domain is tessellated using triangles (in the case of a two-dimensional domain), such that the vertices of the triangles coincide with points in the domain. FIG. 6A illustrates the triangulation of a domain in which points are arranged on a regular hexagonal grid, and it can be seen that all triangles produced in the tessellation have the same area.

Figure 6B:
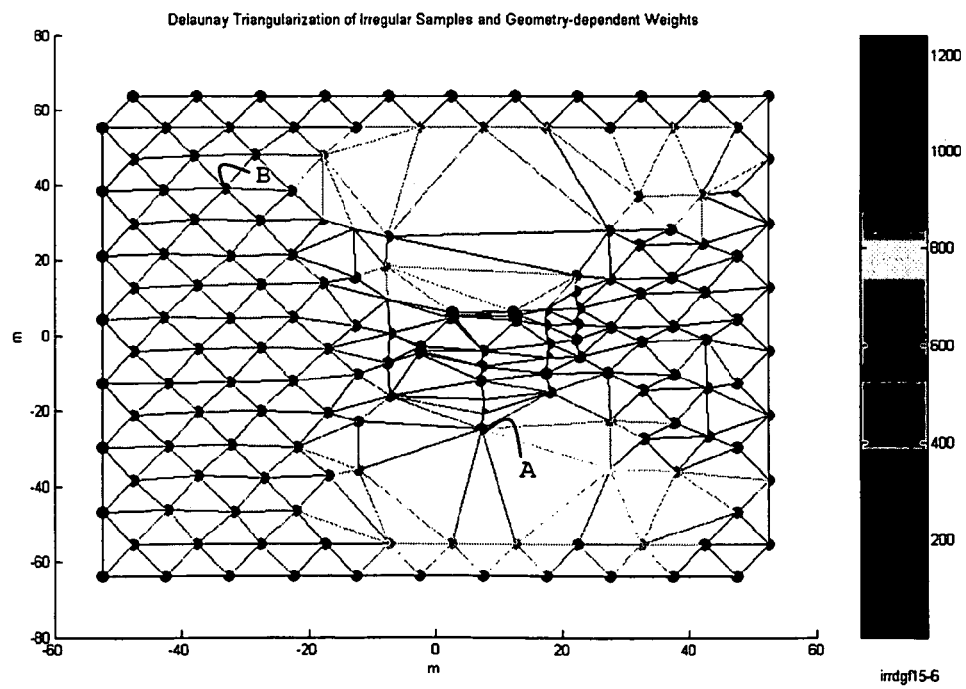
FIG. 6B illustrates a tessellation on the sample space of FIG. 1.

FIG. 6B illustrates the triangulation of a domain in which points are arranged irregularly thus representing the receiver locations of FIG. 1. It can be seen that the triangles defined in the tessellation do not have the same area. Where the points are spaced closely to one another the triangles having vertices at those points have small areas, but where the points are spaced far from one another the triangles having vertices at those points have large areas. It is possible to define a weight for each point. The weight of a point is a geometry-dependent weight, and is proportional to the sum of the areas of triangles for which that point is a vertex, so that closely-spaced points have lower weights than widely-spaced points. As an example, point A in FIG. 6B will have a greater weight than point B in the same figure.

Equally, the sample space may be tessellated by defining non-overlapping cells or areas around each data point. An example of such a tessellation is known as Voronoi tessellation.

At step 4, the time-dependent filter coefficients estimated in step 2 for each actual data location are scaled by the weight determined for that actual data location in step 3.

At step 5, the filter coefficients determined for each actual data location are normalized relative to the ideal filter defined at step 1. For example, the filter coefficients may be normalized so that a characteristic of the estimated filter operator is substantially the same as the corresponding characteristic of the ideal filter operator. In a preferred embodiment, the estimated filter operator for an actual data location is normalized so that the response of the estimated filter operator in a selected subset of the frequency-wavenumber domain (that is, for a pre-determined range of frequency and/or wavenumber) is the same (or substantially the same) as the response of the ideal filter operator.

If the estimated filter operator is normalized so the estimate filter operator and the ideal filter operator achieve identical filtering results within a selected subset of the frequency-wavenumber domain, a useful such subset in processing seismic data is along the frequency axis, i.e. kx=ky=0, where kx and ky are the x- and y- components of the wavenumber. For this particular subset, the normalization rule would be that, for each time lag, the sum of the interpolated, geometry-dependent weighted filter coefficients equals the sum of the ideal filter coefficients.

At step 6, the seismic data acquired at each actual data location are filtered using the filter coefficients estimated for the respective actual data location. Step 6 may be carried out using, for example, any multi-dimensional convolution procedure.

Figure 6C:
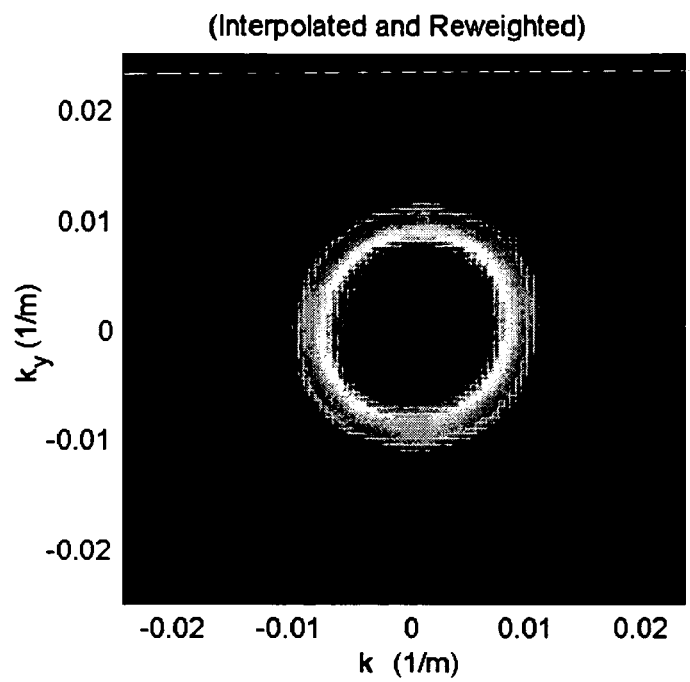
FIG. 6C is a part (main lobe) of the response of a weight-corrected and interpolated filter applied to the data sampled as shown in FIG. 1.

A main lobe of the interpolated and weighted filter is shown in FIG. 6C. The main lobe is more confined with a steeper transition and more circular than the main lobes of FIGS. 4B and 5C.

In FIG. 8, the bottom left panel shows the main lobe of FIG. 6C in the center surrounded by its aliased images and sidelobes generated through the application of the weight-corrected and interpolated filter to the data.

Figure 6D:
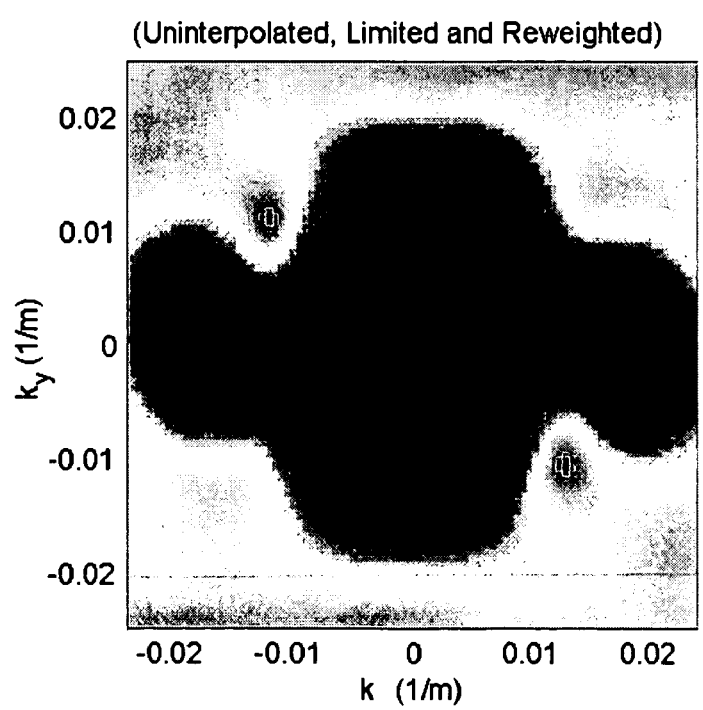
FIG. 6D is a part (main lobe) of the response of a weight-corrected filter applied to the data sampled as shown in FIG. 1.

It is noteworthy that using weighting but not interpolation to determine a corrected filter can in some cases severely deteriorate the result. In FIG. 6D there is shown the main lobe in the filter response of a filter which is weight-corrected but not interpolated. The comparison with FIG. 6C shows that the main lobe is spread over a larger area in the k plane and sidelobes emerge.

In FIG. 8, the bottom middle panel shows the main lobe of FIG. 6D in the center surrounded by its aliased images and sidelobes generated through the application of the exclusively weight-corrected filter to the data.

The filter may be further improved by limiting the geometrical weights to a maximum of 1.1 or 110 per cent of the unit scaling factor. However, the precise amount of this clipping is a matter of optimization and depends on the data set and filter.

Figure 7:
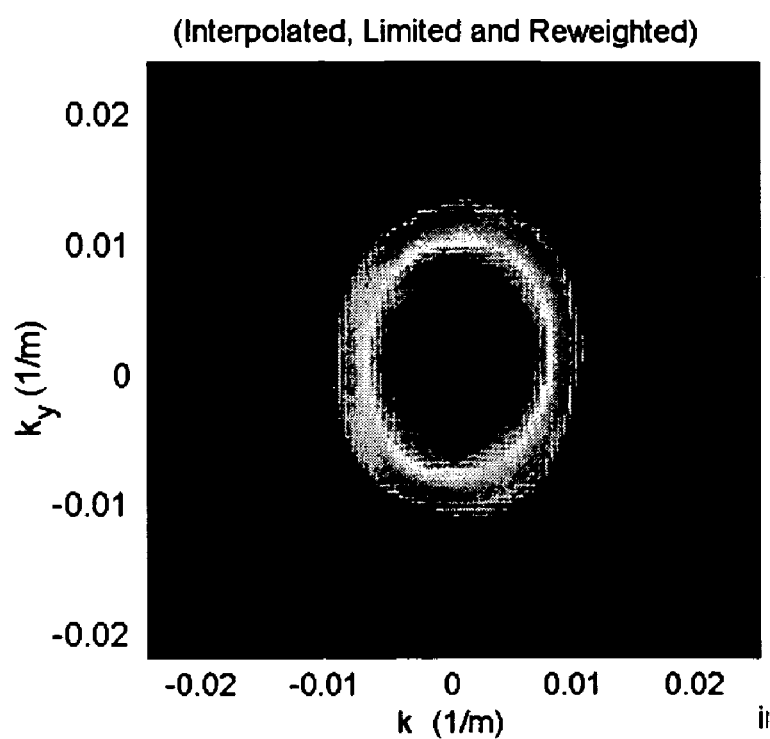
FIG. 7 is a part (main lobe) of the response of a limited weight-corrected and interpolated filter applied to the data sampled as shown in FIG. 1.

In FIG. 7 there is shown the main lobe of a filter which is limited weight-corrected and interpolated.

In FIG. 8, the bottom right panel shows the main lobe of FIG. 7 in the center surrounded by its aliased images and sidelobes generated through the application of the limited weight-corrected and interpolated filter to the data.

The filtered seismic data may then be subjected to further processing steps (not shown). Any suitable seismic data processing steps such as stacking or migration may be applied.

The filter may be a group-forming filter that forms the seismic recordings obtained from point receiver into recordings equivalent to a conventional hard-wired group recording. In this case, the output from step 6 is group-formed seismic data. The group-formed seismic data may undergo further processing.

A more detailed mathematical description of an embodiment of the invention will now be given.

Assume that single sensor seismic data $d(\vec{r},t)$ are available at the receiver locations $\vec{r}_{di}, i=1, \ldots, N_d$. Here $\vec{r}$ denotes a 2-D location vector, and $\vec{r}_{di}$ denotes the actual location of the $i^{th}$ receiver. In general these receiver locations are irregularly distributed.

The filter operator $h(\vec{r},t)$ is defined at locations $\vec{r}_{hi}, i=1, \ldots, N_h$. The $N_h$ locations $\vec{r}_{hi}$ lie on a regular grid (such as, for example, a rectangular or hexagonal grid). These locations will be referred to as "filter locations" for convenience.

Ideally the actual data locations at which single sensor seismic data is available would lie on the same regular grid as the filter operator $h(\vec{r},t)$. That is, the actual data locations $\vec{r}_{di}$ would ideally be coincident with the ideal filter locations $\vec{r}_{hi}$. In this case, the result of applying, at location $\vec{r}$ the filter $h(\vec{r},t)$ for that location to the seismic data $d(\vec{r},t)$ acquired at that location would be given by the convolution summation:

$$g(\vec{r}, t) = \sum_{t'} \sum_{\vec{r}_{hi}} h(\vec{r}_{hi}, t') d(\vec{r} - \vec{r}_{hi}, t - t') \quad (1)$$

Equation (1) may be approximated within the accuracy of the trapezoidal rule, $$g(\vec{r}, t) \approx \sum_{t'} \frac{1}{\Delta S_h} \int d\vec{r}' h_a(\vec{r}', t') d_a(\vec{r} - \vec{r}', t - t') \quad (2)$$

where $h_a(\vec{r},t)$ and $d_a(\vec{r},t)$ are smooth and continuous functions such that $h_a(\vec{r},t)=h(\vec{r},t)$ and $d_a(\vec{r},t)=d(\vec{r},t)$ at $\vec{r}=\vec{r}_{hi}, i=1, \ldots, N_h$, and $\Delta S_h$ is the area of the unit cell in the regular grid. The functions $h_a(\vec{r},t)$ and $d_a(\vec{r},t)$ can be chosen as continuous interpolations of $h(\vec{r},t)$ and $d(\vec{r},t)$ respectively.

The present invention provides a method of determining the convolution $g(\vec{r},t)$ when the receiver locations $\vec{r}_{di}$ are not coincident with the ideal filter locations $\vec{r}_{hi}$—that is, it provides a method of estimating the convolution $g(\vec{r},t)$ for receiver locations lying on an irregular grid.

For this purpose, the first step (step 1 of FIG. 2) is to interpolate the filter coefficients $\{h(\vec{r}_{hi},t), i=1, \ldots, N_h\}$ defined on the regular grid of points onto the irregularly-arranged receiver locations $\vec{r}_{di}$. The interpolated filter coefficients are denoted as $\{\tilde{h}(\vec{r}_{di},t), i=1, \ldots, N_d\}$.

The irregular receiver positions $\{\vec{r}_{di}\}$ are then tessellate into triangles $\{T_j, j=1, \ldots, N_T\}$ using e.g. Delaunay triangulation. Here $N_T$ denotes the number of triangles defined in the tessellation, and the triangle $T_j=(\vec{r}_{j1}, \vec{r}_{j2}, \vec{r}_{j3})$ is defined by its vertices which are at locations $\vec{r}_{j1}, \vec{r}_{j2}, \vec{r}_{j3}$.

Again within the accuracy of the trapezoidal rule, it is possible to approximate the convolution $g(\vec{r},t)$ as:

$$g(\vec{r}, t) \approx \sum_{t'} \frac{1}{\Delta S_h} \sum_{\vec{r}_{di}} \tilde{h}(\vec{r}_{di}, t') \left( \sum_{T_j : \vec{r}_{di} \in T_j} \text{Area}(T_j)/3 \right) d(\vec{r} - \vec{r}_{di}, t - t') \quad (3)$$

where $h_a(\vec{r},t)=\tilde{h}(\vec{r},t)$ at $\vec{r}=\vec{r}_{di}, i=1, \ldots, N_d$ after interpolation.

The convolved output $g(\vec{r},t)$ can then be written as $$g(\vec{r}, t) \approx \sum_{t'} \sum_{\vec{r}_{di}} w(\vec{r}_{di}) \tilde{h}(\vec{r}_{di}, t') d(\vec{r} - \vec{r}_{di}, t - t') \quad (4)$$

where $$w(\vec{r}_{di}) = \frac{1}{3 \Delta S_h} \sum_{T_j : \vec{r}_{di} \in T_j} \text{Area}(T_j) \quad (5)$$

Next the irregular filter is normalized, so that its response along the frequency axis is identical to that of the ideal filter. To do so a normalization factor $\alpha(t')$ is determined for each t', such that:

$$\sum_{\vec{r}_{hi}} h(\vec{r}_{hi}, t') = \alpha(t') \sum_{\vec{r}_{di}} w(\vec{r}_{di}) \tilde{h}(\vec{r}_{di}, t') \quad (6)$$

Since both the interpolation and tessellation steps are dependent only on the spatial coordinates, the normalization factor is actually independent of time.

Finally the new, irregular filter operator is given as $$\tilde{\tilde{h}}(\vec{r}_{di}, t) = \alpha w(\vec{r}_{di}) \tilde{h}(\vec{r}_{di}, t) \quad (7)$$

allowing the computation of the group-formed output using a conventional convolution summation as $$g(\vec{r}, t) \approx \sum_{t'} \sum_{\vec{r}_{di}} \tilde{\tilde{h}}(\vec{r}_{di}, t') d(\vec{r} - \vec{r}_{di}, t - t') \quad (8)$$

Figure 9:
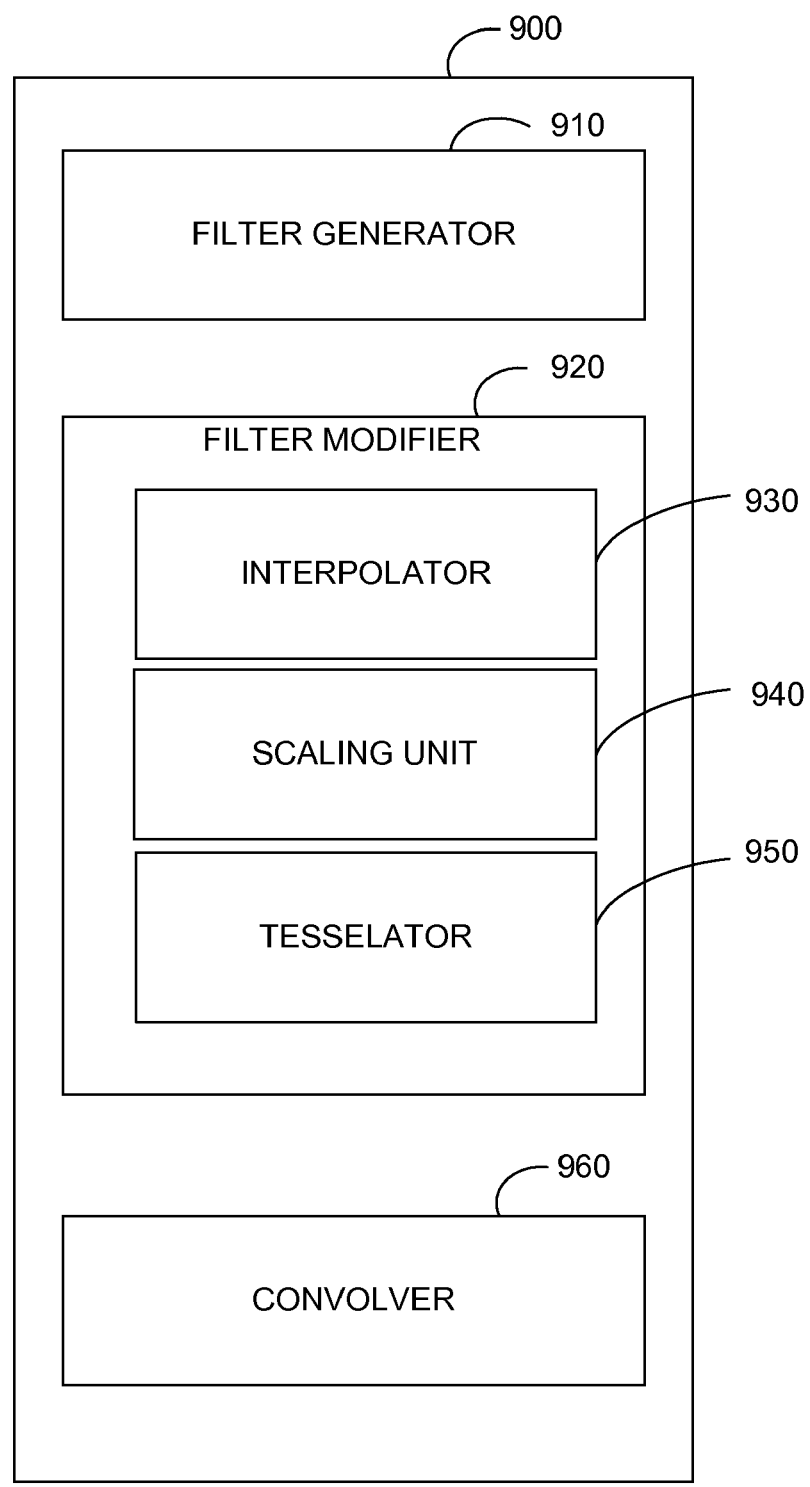
FIG. 9 illustrates a signal filtering apparatus adapted to perform various techniques described herein.

FIG. 9 illustrates a signal filtering apparatus 900 adapted to perform the above-described operations. In particular, apparatus 900 may include a filter generator 910 to generate defined filter values at defined filter points, a filter modifier 920 to determine corrected filter values at corrected filter points coinciding with data points, and a convolver 960 to convolve data values obtained at the data points with the corrected filter values. The filter modifier 920 may include an interpolator 930, a scaling unit 940 and a tesselator 950, all of which may be described in more detail in the above paragraphs.

The invention has been described above with reference to data that has been regularly sampled in time. The invention is not limited to this, however, and may be applied to data that is irregularly sampled in time as well as irregularly sampled in space.

The invention claimed is:

1. A method of filtering data acquired at a plurality of discrete data points, the method comprising:

determining a filter having defined filter values at defined filter points at least partially not coincident with the data points;

assigning one or more weights to the filter values; and using the defined filter values at the defined filter points to determine filter values at the data points, thereby correcting the filter to have filter values at filter points coinciding with the data points and filtering the data using the corrected filter, wherein the data points lie on an irregular grid and the filter points at which the filter is determined lie on a regular grid.

2. The method of claim 1, wherein determining the filter values at the data points includes the step of interpolating filter values at corrected filter points between the defined filter points.

3. The method of claim 1, wherein determining the filter values at the data points includes the step of interpolating filter values between the defined filter points using an interpolation that preserves the defined filter values at the defined filter points.

4. The method of claim 1, wherein filtering the data using the corrected filter includes the step of performing a convolution.

5. The method of claim 1, wherein filtering the data using the corrected filter essentially consists of the step of performing a convolution.

6. The method of claim 1, wherein the weights at a data or corrected filter point is related to the density of data or corrected filter points in the neighborhood of the data or corrected filter point.

7. The method of claim 1, wherein the weights at a data or corrected filter point is derived from a tessellation of a domain of the data points or corrected filter points.

8. The method of claim 1, wherein the weights at a data or corrected filter point is clipped to limit the extreme values of the additional weights.

9. The method of claim 1, wherein determining the filter values at the data points includes the steps of interpolating filter values to corrected filter points between the defined filter points and of assigning weights to the filter values.

10. The method of claim 1, wherein the corrected filter is normalized to have a characteristic substantially identical to the corresponding characteristic of the defined filter.

11. The method of claim 10, wherein the characteristic is the response of the filter in at least part of a data domain or any of its transforms.

12. The method of claim 10, wherein the characteristic is the response of the filter for a pre-determined range of frequencies and/or wavenumbers.

13. The method of claim 12, wherein the response of the corrected filter is normalized to have the response of the defined filter along the frequency axis.

14. The method of claim 1, further comprising the step of obtaining seismic data for use as the data.

15. The method of claim 1, further comprising the step of obtaining point receiver seismic data for use as the data.

16. The method of claim 1, further comprising the step of obtaining point receiver seismic data for use as the data and using the filtering to generate a filtered output at a point receiver location.

17. The method of claim 1, further comprising the step of obtaining point receiver seismic data for use as the data and using the filtering to attenuate noise from and/or anti-alias the obtained data.

* * * * *